United States Patent
Park

(10) Patent No.: US 10,082,961 B2
(45) Date of Patent: Sep. 25, 2018

(54) MEMORY SYSTEM HAVING MULTIPLE HOST CHANNEL AND PERFORMING A CACHE OPERATION AND METHOD OF OPERATING THE SAME

(71) Applicant: SK hynix Inc., Gyeonggi-do (KR)

(72) Inventor: Sang Bin Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 328 days.

(21) Appl. No.: 14/657,765

(22) Filed: Mar. 13, 2015

(65) Prior Publication Data

US 2016/0124640 A1 May 5, 2016

(30) Foreign Application Priority Data

Nov. 3, 2014 (KR) .......................... 10-2014-0151260

(51) Int. Cl.
*G06F 3/06* (2006.01)
*G06F 12/02* (2006.01)
(Continued)

(52) U.S. Cl.
CPC ............ *G06F 3/061* (2013.01); *G06F 3/0655* (2013.01); *G06F 3/0685* (2013.01);
(Continued)

(58) Field of Classification Search
CPC .... G06F 3/061; G06F 12/0246; G06F 3/0655; G06F 3/0685; G06F 3/0688;
(Continued)

(56) References Cited

U.S. PATENT DOCUMENTS 5,742,792 A * 4/1998 Yanai ................... G06F 3/0601
710/1
7,761,684 B2 * 7/2010 Eguchi ................. G06F 3/0608
711/112

(Continued)

FOREIGN PATENT DOCUMENTS

KR 1020100037874 4/2010
KR 1020100124082 11/2010

OTHER PUBLICATIONS

Anonymous, "RAID Mirroring", May 2, 1010, pp. 1-3, https://web.archive.org/web/20100502014003/http://www.backupnut.com/raid.html.*

(Continued)

*Primary Examiner* — Christopher D Birkhimer
(74) *Attorney, Agent, or Firm* — IP & T Group LLP

(57) ABSTRACT

A memory system includes a first control circuit part configured to communicate with a host through a first host channel, a second control circuit part configured to communicate with the host through a second host channel, a first chip group configured to communicate with the first control circuit part through a first internal channel, and a second chip group configured to communicate with the second control circuit part through a second internal channel, wherein the first control circuit part and the second control circuit part alternately receive a plurality of data inputted through one of the first and second host channels, which is selected during a single channel operation, and transmit the data to the first chip group and the second chip group.

16 Claims, 6 Drawing Sheets

(51) Int. Cl.
*G06F 12/08* (2016.01)
*G06F 12/0802* (2016.01)

(52) U.S. Cl.
CPC ........ *G06F 3/0688* (2013.01); *G06F 12/0246* (2013.01); *G06F 12/0802* (2013.01); *G06F 2212/1016* (2013.01); *G06F 2212/2022* (2013.01); *G06F 2212/221* (2013.01); *G06F 2212/7201* (2013.01)

(58) Field of Classification Search
CPC ......... G06F 12/0802; G06F 2212/7201; G06F 2212/1016; G06F 2212/2022; G06F 2212/221
See application file for complete search history.

(56) References Cited

U.S. PATENT DOCUMENTS

| | | | | |
|---|---|---|---|---|
| 7,930,509 B2* | 4/2011 | Eguchi | ................. | G06F 3/0608 711/112 |
| 8,190,846 B2* | 5/2012 | Eguchi | ................. | G06F 3/0608 711/170 |
| 8,321,597 B2* | 11/2012 | Yu | ................. | G06F 11/108 710/22 |
| 8,451,700 B2* | 5/2013 | Kobayashi | ............ | G11B 7/1353 369/44.42 |
| 8,478,928 B2* | 7/2013 | Lee | ................. | G06F 1/266 711/103 |
| 8,527,698 B2* | 9/2013 | Bert | ................. | G06F 11/1076 710/39 |
| 8,543,742 B2* | 9/2013 | Yu | ................. | G06F 3/0604 710/22 |
| 8,549,247 B2* | 10/2013 | Satoyama | ............ | G06F 3/0608 711/114 |
| 8,566,508 B2* | 10/2013 | Borchers | ............... | G06F 3/0613 711/103 |
| 8,601,085 B1* | 12/2013 | Ives | ................. | H04L 67/1097 709/211 |
| 8,683,171 B2* | 3/2014 | Eguchi | ................. | G06F 3/0608 711/170 |
| 8,700,881 B2* | 4/2014 | Lee | ................. | G06F 12/0246 711/103 |
| 8,762,620 B2* | 6/2014 | Prins | ................. | G06F 13/1657 711/103 |
| 8,762,672 B2* | 6/2014 | Eguchi | ................. | G06F 3/061 707/999.201 |
| 8,832,372 B2* | 9/2014 | Jibbe | ................. | G06F 3/061 711/114 |
| 8,838,851 B2* | 9/2014 | Riordan | ................. | G06F 3/061 709/238 |
| 8,856,264 B2* | 10/2014 | Nagami | ................. | H04L 47/125 709/214 |
| 2007/0079099 A1* | 4/2007 | Eguchi | ................. | G06F 3/0608 711/170 |
| 2009/0083482 A1* | 3/2009 | Price | ................. | G06F 3/0613 711/114 |
| 2010/0257333 A1* | 10/2010 | Eguchi | ................. | G06F 3/0608 711/172 |
| 2010/0274952 A1* | 10/2010 | Lee | ................. | G06F 12/0292 711/103 |
| 2010/0293319 A1* | 11/2010 | Lim | ................. | G06F 3/0613 711/103 |
| 2011/0185148 A1* | 7/2011 | Eguchi | ................. | G06F 3/0608 711/170 |
| 2011/0302358 A1* | 12/2011 | Yu | ................. | G06F 11/108 711/103 |
| 2012/0166748 A1* | 6/2012 | Satoyama | ............. | G06F 3/0608 711/165 |
| 2012/0233436 A1* | 9/2012 | Eguchi | ................. | G06F 3/0608 711/170 |
| 2012/0278543 A1* | 11/2012 | Yu | ................. | G06F 3/0604 711/103 |
| 2012/0331188 A1* | 12/2012 | Riordan | ................. | G06F 3/061 710/33 |
| 2013/0262750 A1* | 10/2013 | Yamasaki | ............. | G06F 3/0611 711/103 |
| 2013/0290613 A1* | 10/2013 | Uehara | ................. | G06F 3/0688 711/103 |
| 2014/0164729 A1* | 6/2014 | Eguchi | ................. | G06F 3/0608 711/170 |
| 2014/0195698 A1* | 7/2014 | Chaurasia | ............. | G06F 3/0617 710/38 |
| 2014/0195726 A1* | 7/2014 | Lee | ................. | G06F 12/0292 711/103 |

OTHER PUBLICATIONS

Microsoft, "Computer Dictionary", Fifth Edition, 2002, p. 182.*
Jeffrey B. Layton, "Intro to Nested-RAID: RAID-01 and RAID-10", Jan. 6, 2011, pp. 1-8, http://www.linux-mag.com/id/7928/.*
Paul Massiglia, "The RAID Book: A Storage System Technology Handbook", Sixth Edition, 1997, pp. 152-157.*
Webopedia, "Dynamic RAM", Apr. 5, 2001, pp. 1-2, https://web.archive.org/web/20010405223253/http://www.webopedia.com/TERM/D/dynamic_RAM.html.*
Sanam Shahla Rizvi et al., "Data Storage Framework on Flash Memory Based SSD RAID 0 for Performance Oriented Applications", IEEE, 2010, pp. 126-128.*
Evan Jennings et al., "DRAM (Dynamic Random Access Memory)", Aug. 8, 2011, pp. 1-12, https://web.archive.org/web/20110808012228/http://searchstorage.techtarget.com/definition/DRAM.*

* cited by examiner

MEMORY SYSTEM HAVING MULTIPLE HOST CHANNEL AND PERFORMING A CACHE OPERATION AND METHOD OF OPERATING THE SAME

CROSS-REFERENCE TO RELATED APPLICATION

The present application claims priority to Korean patent application number 10-2014-0151260, filed on Nov. 3, 2014, the entire disclosure of which is incorporated herein in its entirety by reference.

BACKGROUND

Field of Invention

The present invention relates to a memory system and a method of operating the same. More specifically, the present invention relates to a memory system capable of improving operation speed and a method of operating the same.

Discussion of Related Art

As large volume files such as music and moving images are used in portable electronic devices, the portable electronic devices are requiring memory systems with large storage volume. Memory systems include a plurality of memory devices to increase storage capacity. In memory systems including a plurality of memory devices, fast operation speed as well as large storage capacity are important characteristics.

The plurality of memory devices included in memory systems may be embodied using semiconductors such as silicon (Si), germanium (Ge), gallium arsenide (GaAs), and indium phosphide (InP). Semiconductor memory devices are generally classified into volatile and nonvolatile memory devices.

When the supply of electric power to volatile memory is cut off, data stored in the volatile memory disappears. Volatile memory devices include static RAM (SRAM), dynamic RAM (DRAM), synchronous DRAM (SDRAM), and the like. On the other hand, when the supply of electric power to nonvolatile memory devices is cut off, data stored in nonvolatile memory devices is maintained. Nonvolatile memory devices include read only memory (ROM), programmable ROM (PROM), erasable programmable ROM (EPROM), electrically erasable programmable ROM (EEPROM), flash memory, phase-change RAM (PRAM), magnetoresistive RAM (MRAM), resistive RAM (RRAM), ferroelectric RAM (FRAM), and the like. Flash memory may be further classified into NOR type and NAND type.

A plurality of semiconductor memory devices may be connected to a controller configured to control the semiconductor memory devices through a plurality of channels, and thus the controller selects and accesses the plurality of semiconductor memory devices at the same time. However, the above multi-channel access method is not applicable to semiconductor memory devices which are accessed through only one channel. When using only one channel in a real system, not a test environment, channels other than the selected channel are not used, and thus, operation speed may be slowed.

SUMMARY

The present invention is directed to a memory system capable of improving operation speed when performing an operation using only one channel among a plurality of channels included therein and a method of operating the same.

One aspect of the present invention provides a memory system including a first control circuit part suitable for communicating with a host through a first host channel, a second control circuit part suitable for communicating with the host through a second host channel, a first chip group suitable for communicating with the first control circuit part through a first internal channel, and a second chip group suitable for communicating with the second control circuit part through a second internal channel, wherein the first control circuit part and the second control circuit part alternately receive a plurality of data inputted through one of the first and second host channels, which is selected during a single channel operation, and transmit the data to the first chip group and the second chip group.

Another aspect of the present invention provides a memory system including a first: flash translation layer part connected to a first host channel, a first control circuit suitable for receiving first data from the first flash translation layer part and transmitting the first data to a first memory chip group, a second flash translation layer part connected to a second host channel, a second control circuit suitable for receiving second data from the second flash translation layer part and transmitting the second data to a second memory chip group, a first buffer suitable for receiving the second data from the second flash translation layer part, latching the second data and transmitting latched second data to the first control circuit, and a second buffer suitable for receiving the first data from the first flash translation layer part, latching the first data and transmitting latched first data to the second control circuit.

Still another aspect of the present invention provides a method of operating a memory system, including inputting data to a flash translation layer part and sequentially transforming the data into first to third data having transformed addresses, transmitting the first data to a first control circuit part connected to a first memory chip group, transmitting the first data to the first memory chip group and transmitting the second data to a second control circuit part connected to a second memory chip group at the same time, and transmitting the second data to the second memory chip group and transmitting the third data to the first control circuit part at the same time.

Yet another aspect of the present invention provides a method of operating a memory system, including performing a read operation on a memory chip group selected from a plurality of memory chip groups, transmitting a plurality of pieces of read data to a first control circuit part connected to a selected memory chip group through an internal channel, alternately transmitting a plurality of pieces of data received in the first control circuit part to a first flash translation layer part and a second control circuit part corresponding to a non-selected memory chip group among the plurality of memory chip groups, transmitting data stored in the second control circuit part to a second flash translation layer part while transforming data transmitted to the fi flash translating layer part, and outputting data transformed by the first flash translation layer part and the second flash translation layer part.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION

Hereinafter, exemplary embodiments of the present invention will be described in detail with reference to the accompanying drawings. In the following description and the appended drawings, detailed descriptions of well-known functions or constructions will be omitted if they obscure the invention with unnecessary detail. Also, the present invention may be embodied in different forms and should not be construed as limited to the embodiments set forth herein. The exemplary embodiments described herein are only provided so that a skilled person in the art of the present invention can embody the inventive concept of the present invention.

Throughout this specification, it will be understood that when a portion is "connected to" another portion, the portion may be "directly connected to" another portion, or the portion may be "indirectly connected to" another portion with an intervening element between the portions, Throughout this specification, it will be understood that when a portion "includes" another portion, without any contrary statement, the portion should not exclude another element, but may include another element.

Figure 1:
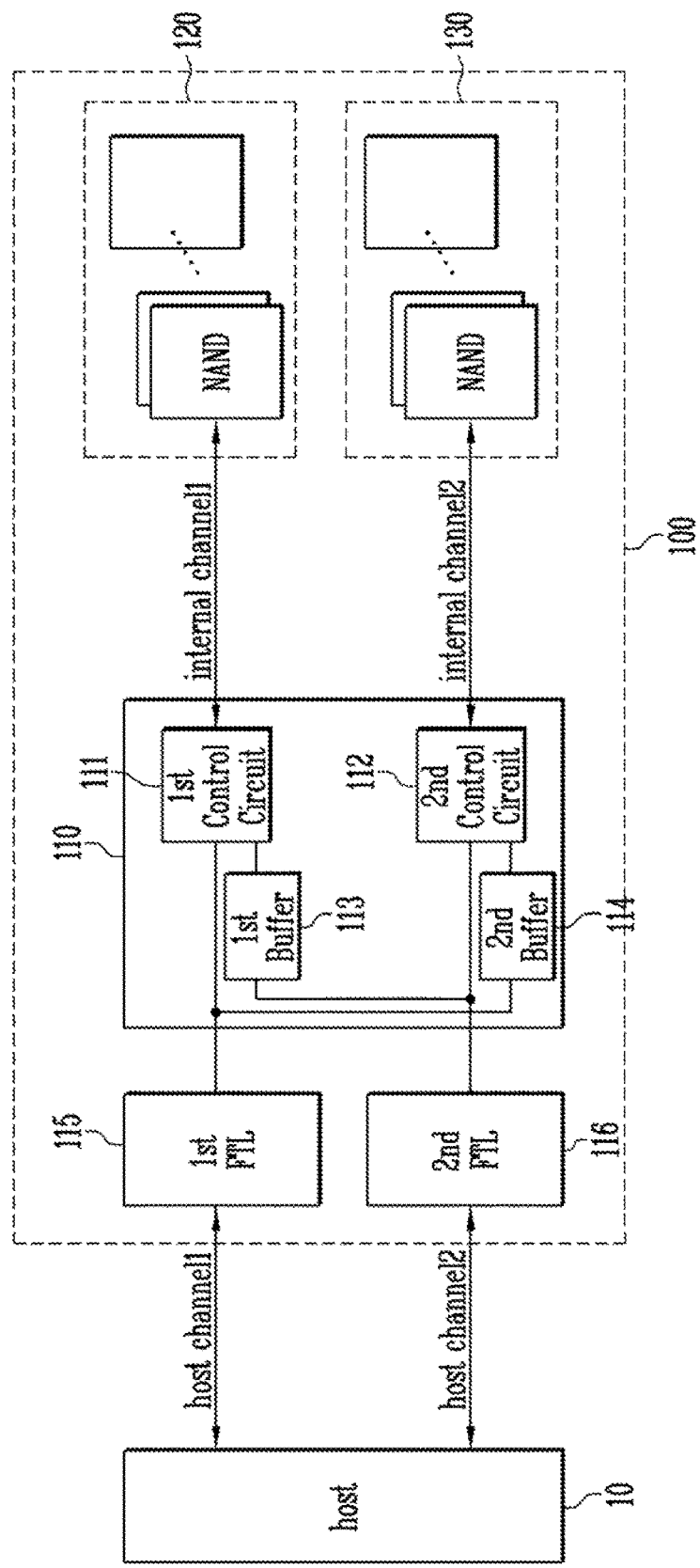
FIG. 1 is a block diagram illustrating a memory system according to an embodiment of the present invention.

FIG. 1 is a block diagram illustrating a memory system according to an embodiment of the present invention.

Referring to FIG. 1, a memory system 100 according to an embodiment of the present invention includes a controller 110, first and second flash translation layer parts (FTL) 115 and 116, and first and second NAND chip groups 120 and 130. The controller 110 includes a first control circuit 111, a second control circuit 112, a first buffer 113, and a second buffer 114.

The first flash translation layer part 115 is connected to a first host channel 'host channel 1' which is connected to a host 10. The first flash translation layer part 115 transforms a logic address of data inputted from the host 10 during a data input operation into a physical address of a NAND chip, and performs a requested operation with reference to the transformed physical address. The first flash translation layer part 115 is connected to the first control circuit 111 and the second buffer 114, and the first flash translation layer part 115 is capable of selectively outputting data in which the address transformation operation is completed to the first control circuit 111 or the second buffer 114, and performing an operation of alternately transmitting data to the first control circuit 111 and the second buffer 114. For example, the first flash translation layer part 115 transforms first and second data which are sequentially inputted, and then outputs first data which is firstly inputted and transformed to the first control circuit 111, and outputs second data which is secondly inputted and transformed after the first data to the second buffer 114.

Also, during the data output operation, the first flash translation layer part 115 transforms a physical address of data transmitted from the first control circuit 111 or the second buffer 114 to a logic address, and outputs the logic address to the host 10 through the first host channel 'host channel 1'.

The first control circuit 111 is connected to the first NAND chip group 120 through a first internal channel 'internal channel 1'. The first control circuit 111 selectively latches data transmitted from the first flash translation layer part 115 or data transmitted from the first buffer 113 during the data input operation, and then, transmits the latched data to the first NAND chip group 120 through the first internal channel 'internal channel 1'.

Also, during the data output operation, the first control circuit 111 receives data read from the first NAND chip group 120 through the first internal channel 'internal channel 1', and transmits the read data to the first flash translation layer part 115 or the first buffer 113. Here, the read data is alternately transmitted to the first flash translation layer part 115 and the first buffer 113. For example, between the first data and the second data sequentially read from the first NAND chip group 120, the first data which is firstly read is transmitted to the first flash translation layer 115, and the second data, which is read after the first data is read, is transmitted to the first buffer 113.

The first buffer 113 is connected between the second flash translation layer part 116 and the first control circuit 111. During the data input operation, the first buffer 113 latches data transmitted from the second flash translation layer part 116 and transmits the latched data to the first control circuit 111, and during the data output operation, the first buffer 113 latches data transmitted from the first control circuit 111 and transmits the latched data to the second flash translation layer part 116.

The second flash translation layer part 116 is connected to a second host channel 'host channel 2' which is connected to the host 10. The second flash translation layer part 116 transforms a logic address of data inputted from the host 10 during a data input operation into a physical address of a NAND chip, and performs a requested operation with reference to the transformed physical address. The second flash translation layer part 116 is connected to the second control circuit 112 and the first buffer 113, and the second flash translation layer part 116 is capable of selectively outputting data in which the address transformation operation is completed to the second control circuit 112 or the first buffer 113, and performing an operation of alternately transmitting data to the second control circuit 112 and the first buffer 113. For example, the second flash translation layer part 116 transforms first and second data which are sequentially inputted, and then outputs first data which is firstly inputted and transformed to the second control circuit 112, and outputs second data which is secondly inputted and transformed after the first data to the first buffer 113.

Also, during the data output operation, the second flash translation layer part 116 transforms a physical address of data transmitted from the second control circuit 112 or the first buffer 113 to a logic address, and outputs the logic address to the host 10 through the second host channel 'host channel 2'.

The second control circuit 112 is connected to the second NAND chip group 130 through a second internal channel 'internal channel 2'. The second control circuit 112 selectively latches data transmitted from the second flash translation layer part 116 or data transmitted from the second buffer 114 during the data input operation, and then transmits the latched data to the second NAND chip group 130 through the second internal channel 'internal channel 2'.

Also, during the data output operation, the second control circuit 112 receives data read from the second NAND chip group 130 through the second internal channel 'internal channel 2', and transmits the read data to the second flash translation layer part 116 or the second buffer 114. Here, the read data is alternately transmitted to the second flash translation layer part 116 and the second buffer 114, For example, between the first data and the second data sequentially read from the second NAND chip group 130, the first data which is firstly read is transmitted to the second flash translation layer part 116, and the second data, which is read after the first data is read, is transmitted to the second buffer 114.

The second buffer 114 is connected between the first flash translation layer part 115 and the second control circuit 112. During the data input operation, the second buffer 114 latches data transmitted from the first flash translation layer part 115 and transmits the latched data to the second control circuit 112, and during the data output operation, the second buffer 114 latches data transmitted from the second control circuit 112 and transmits the latched data to the first flash translation layer part 115.

Each of the first and second NAND chip groups 120 and 130 includes a plurality of NAND chips, and the plurality of NAND chips may include NAND flash memory devices. Also, it will be understood that it may includes other nonvolatile memory devices instead of the plurality of NAND chips. For example, any one of various types of nonvolatile memory devices such as a NOR flash memory device, a ferroelectric RAM (FRAM) using a ferroelectric capacitor, a magnetoresistive RAM (MRAM) using a tunneling magnetoresistance (TMR) layer, a phase-change RAM (PRAM) using a chalcogenide alloys, a resistive RAM (RRAM) using a transition metal oxide, and the like may be included instead of the plurality of NAND chips.

Figure 2:
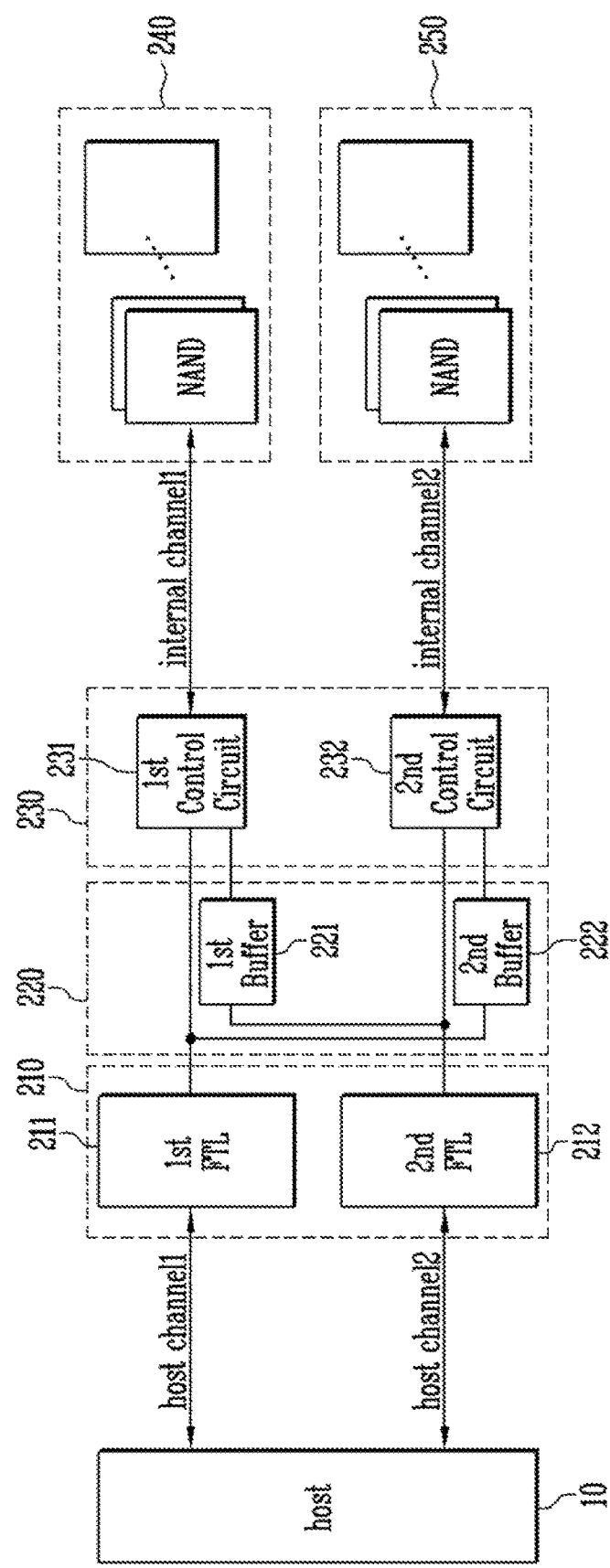
FIG. 2 is a block diagram illustrating a memory system according to another embodiment of the present invention.

FIG. 2 is a block diagram illustrating a memory system according to another embodiment of the present invention.

Referring to FIG. 2, the memory system according to an embodiment of the present invention includes a translation layer part 210, a buffer part 220, a controller 230, and first and second NAND chip groups 240 and 250. When the memory system shown in FIG. 2 is compared with the memory system 100 shown in FIG. 1, the buffer part 220 including first and second buffers 221 and 222 is disposed on the outside of the controller 230. Here, the buffer part 220 may be included in a SRAM or DRAM disposed between a host 10 and the controller 230.

Figure 3:
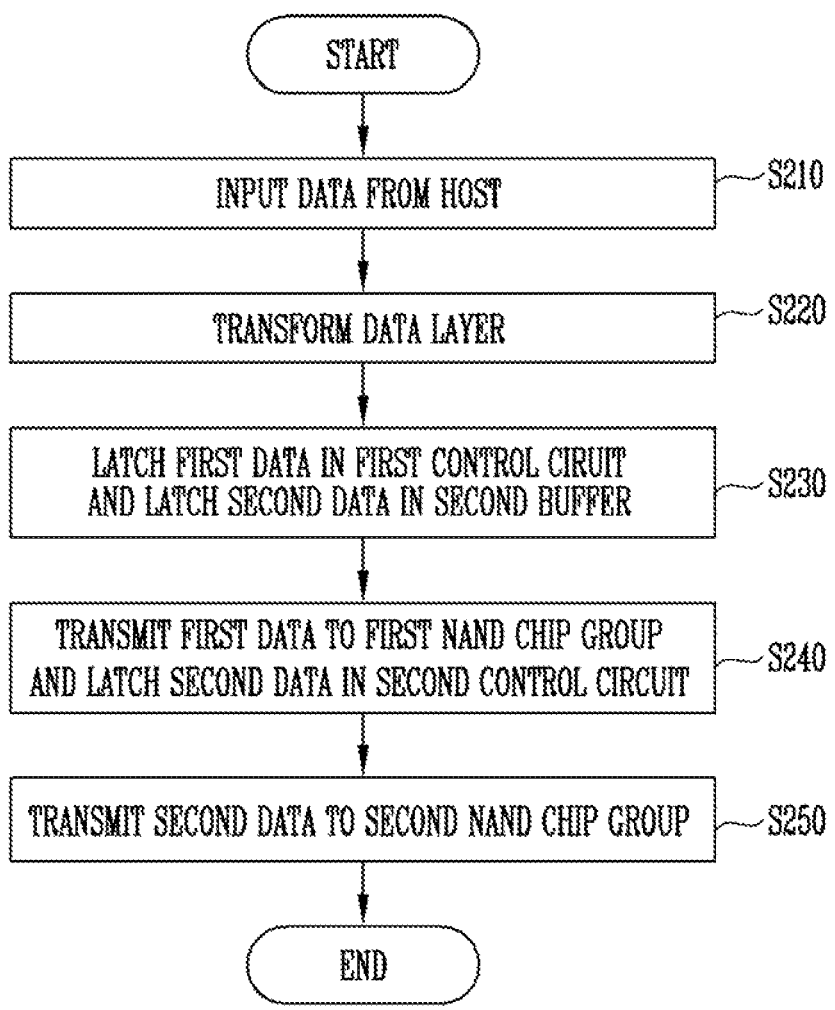
FIG. 3 is a flow chart illustrating a data input operation of the memory system according to an embodiment of the present invention.

FIG. 3 is a flow chart illustrating a data input operation of a memory system according to an embodiment of the present invention.

The data input operation of the memory system according to an embodiment of the present invention with reference to FIGS. 1 and 3 will be explained as follows.

1) Inputting Data from a Host (S210)

During the data input operation, a plurality of data are inputted from a host 10 to a controller 110 through one host channel (for example, a first host channel 'host channel 1') in sequence.

2) Transforming a Data Layer (S220)

The first flash translation layer part 115 transforms a logic address of a plurality of data inputted from the host 10 into a physical address of a NAND chip, and performs a requested operation with reference to the transformed physical address. The data with the transformed address are alternately transmitted to the first control circuit 111 and the second buffer 114.

3) Latching First Data in a First Control Circuit, and Latching Second Data in a Second Buffer (S230)

The data having the address transformed by the first flash translation layer part 115 are alternately transmitted to the first control circuit 111 and the second buffer 114 and latched. For example, first data which is firstly transformed by the first flash translation layer part 115 is transmitted to the first control circuit 111 and latched, and second data which is transformed after the transformation of the first data is transmitted to the second buffer 114 and latched. Also, then, third data which is transformed after the transformation of the second data is transmitted to the first control circuit 111 again and latched.

4) Transmitting First Data to a First NAND Chip Group, and Latching Second Data in a Second Control Circuit (S240)

First data latched in the first control circuit 111 is transmitted to a selected NAND chip among the first NAND chip group 120 and programmed. Also, second data latched in the second buffer 114 is latched in the second control circuit 112 at the same time.

5) Transmitting Second Data to a Second NAND Chip Group (S250)

Second data latched in the second control circuit 112 transmitted to a selected NAND chip among the second NAND chip group 130 and programmed. Also, third data whose address is transformed by the first flash translation layer part 115 is latched in the first control circuit 111, and transmitted to a selected NAND chip among the first NAND chip group 120 and programmed after the program operation on the second data.

As described above, in an embodiment of the present invention, data sequentially inputted from the host 10 during a single channel operation is transformed by the first flash translation layer 115, and then the transformed data may be alternately transmitted to the first NAND chip group 120 and the second NAND chip group 130 through the first control circuit 111 and the second control circuit 112. That is, when only one host channel is used during the operation of data input, the controller 110 is controlled to access the first NAND chip group 120 and the second NAND chip group 130, and thus a cache operation becomes possible. Thus, the speed of the data input operation may be improved.

Figure 4:
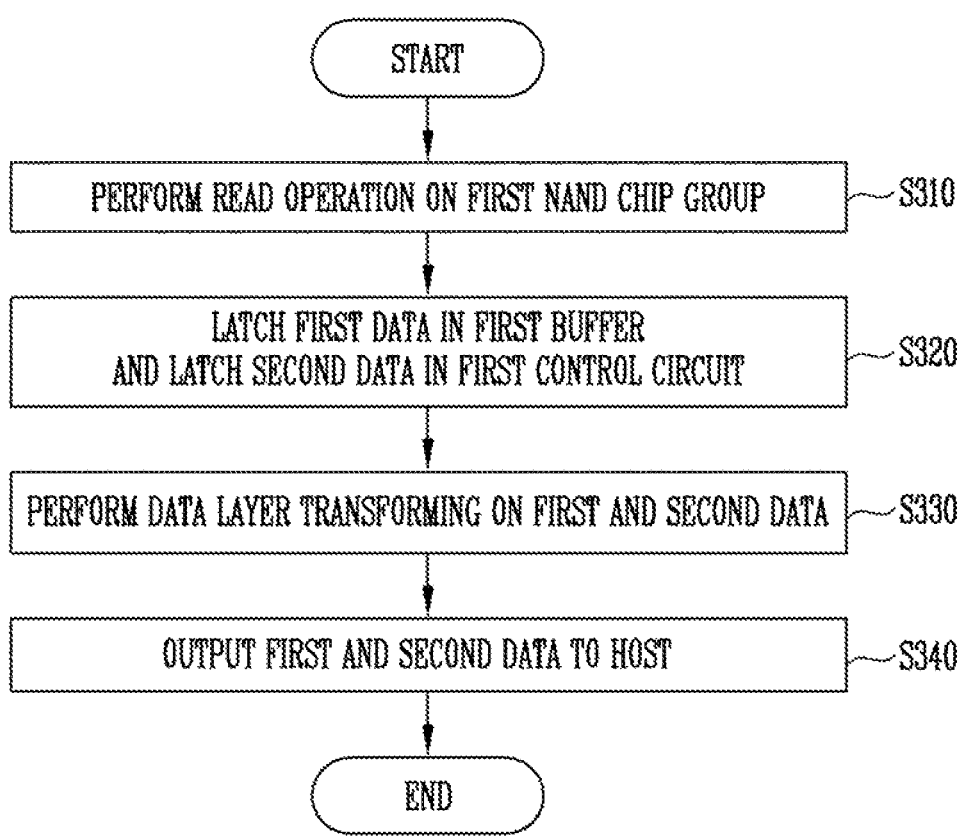
FIG. 4 is a flow chart illustrating a data output operation of the memory system according to an embodiment of the present invention.

FIG. 4 is a flow chart illustrating a data output operation of a memory system according to an embodiment of the present invention.

The data output operation of the memory system according to an embodiment of the present invention with reference to FIGS. 1 and 4 will be explained as follows.

1) Performing a Read Operation on a First NAND Chip Group (S310)

The read operation of a selected NAND chip group (for example, the first NAND chip group 120 among a plurality of NAND chip groups) is performed.

Here, the read operation may be a read operation of one NAND chip or successive read operations of a plurality of NAND chips included in the first NAND chip group 120.

2) Latching First Data in a First Buffer, and Latching Second Data in a First Control Circuit (S320)

The plurality of data read during the read operation of the first NAND chip group 120 are sequentially transmitted to the first control circuit 111.

The first control circuit 111 may alternately transmit the plurality of data sequentially transmitted to the first buffer 113. For example, the first control circuit 111 transmits first data which is firstly received to the first buffer 113, and latches second data received after transmission of the first data.

3) Performing Data Layer Transforming on Data Layer of First and Second Data (S330)

The first control circuit 111 transmits the second data which is being latched therein to the first flash translation layer part 115, and the first flash translation layer part 115 transforms a physical address of the second data into a logic address.

Also, the first data latched in the first buffer 113 is transmitted to the second flash translation layer part 116, and the second flash translation layer part 116 transforms a physical address of the first data into a logic address Here, the transformation operation timings of the first data and the second data may overlap each other.

4) Outputting First and Second Data to a Host (S340)

The second data transformed by the first flash translation layer part 115 and the first data transformed by the second flash translation layer part 116 are outputted to the host 10 through a first host channel 'host channel 1' and a second host channel 'host channel 2', respectively.

According to the above-mentioned embodiment of the present invention, the data read from the selected NAND chip group is alternately transmitted to the first and second flash translation layer parts, and the data is transformed by the first and second flash translation layer parts, thereby being outputted to the host through a plurality of host channels. Thus, time for transforming data is decreased, and since data is outputted through the plurality of host channels, time for the data output operation is decreased.

Figure 5:
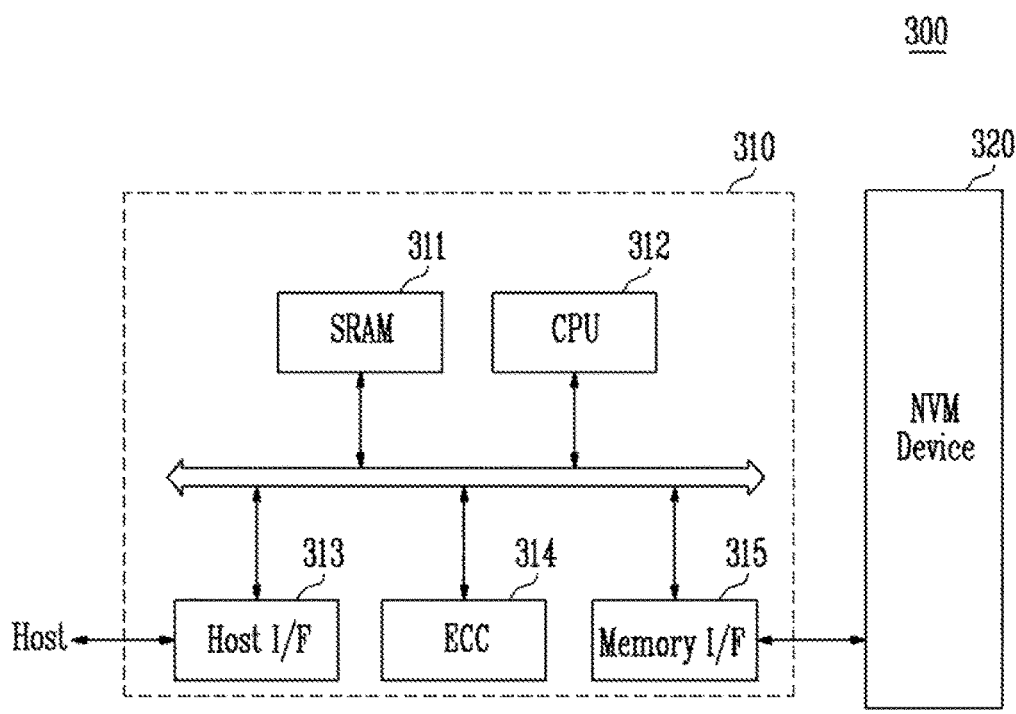
FIG. 5 is a block diagram illustrating an application embodiment of the memory system shown in FIG. 1.

FIG. 5 is a block diagram illustrating a memory system according to an embodiment of the present invention.

Referring to FIG. 5, a memory system 300 according to an embodiment of the present invention includes a nonvolatile memory (NVM) device 320 and a memory controller 310.

The NVM device 320 may include a semiconductor device having a plurality of NAND chips as described above. The memory controller 310 may be configured to control the NVM device 320. The NVM device 320 may be combined with the memory controller 310, and used as a memory card or a semiconductor disk device such as a solid state disk (SSD). An SRAM 311 is used as an operational memory of a central processing unit (CPU) 312. Also, the SRAM 311 may include a buffer part 220 described in FIG. 2.

A host interface 313 includes a data exchange protocol of a host Host coupled to the memory system 300. An error correcting code block (ECC) 314 detects and corrects an error in the data read from a cell area of the NVM device 320. A memory interface 315 may include a plurality of flash transition layer parts a plurality of buffers, and a plurality of control circuits similar to the controller 110 shown in FIG. 1, and interfaces with the NVM device 320 of the present invention. Also, the memory interface 315 may interface with the NVM device 320 during a data input operation and a data output operation similar to the controller 110 shown in FIG. 1, and may improve operation speed by enabling a cache operation.

Although not shown in the drawing, a person skilled in the art will understand that the memory system 300 according to an embodiment of the present invention may further include a ROM (not shown) configured to store code data for interfacing with the host Host and the like. The NVM device 320 may be provided as a multi-chip package having a plurality of flash memory chips. The memory system 300 according to an embodiment of the present invention may provide a highly reliable storage medium having improved operation characteristics. In particular, the flash memory device according to the embodiments of the present invention may be included in a memory system such as a semiconductor disk device (e.g., an SSD) which has been actively studied. In this case, the memory controller 310 may be configured to communicate with the outside (for example, the host Host) through at least one of various interface protocols such as a USB, a MMC, a PCI-E, a SATA, a PATA, an SCSI, an ESDI, an IDE etc.

Figure 6:
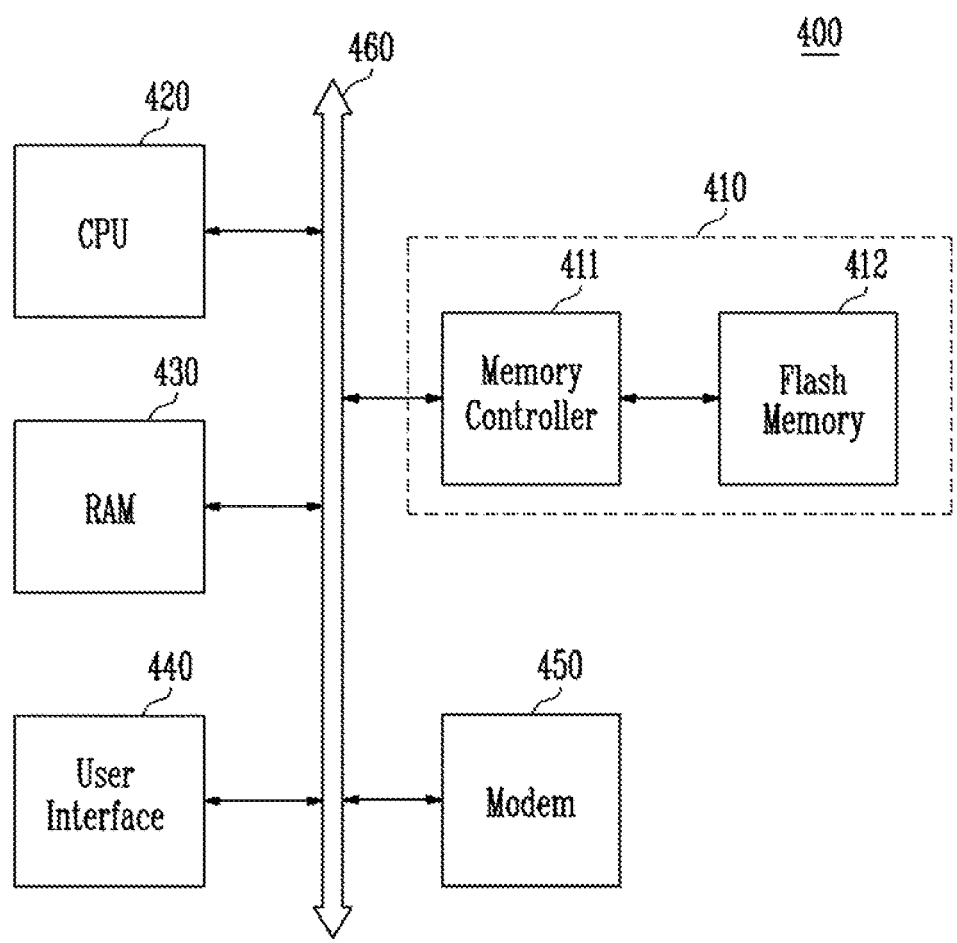
FIG. 6 is a block diagram illustrating a computing system including a memory system described with reference to FIG. 5.

FIG. 6 is a block diagram schematically illustrating a computing system including a memory system according to an embodiment of the present invention.

The computing system 400 according to an embodiment of the present invention includes a CPU 420, a RAM 430, a user interface 440, a modem 450 such as a baseband chipset, and a memory system 410, which are electrically connected to a system bus 460. When the computing system 400 is a mobile device, a battery (not shown) configured to supply an operating voltage to the computing system 400 may be additionally provided. Although not shown in the drawing, a person skilled in the art will understand that, in the computing system 400 according to an embodiment of the present invention, an application chipset, a camera image processor (CIS), a mobile DRAM, and/or the like may be further provided. The memory system 410, for example, may be included in a solid state drive/disk (SSD) using a nonvolatile memory to store data, or the memory system 410 may be provided to a fusion flash memory (for example, an OneNAND flash memory).

The memory system 410 may include a memory controller 411 and a flash memory 412, and the memory controller 411 may be configured similar to the controller shown in FIG. 1, and thus may interface with the flash memory 412 during the data input operation and the data output operation, thereby improving operation speed by enabling a cache operation.

The above-mentioned embodiment of the present invention may not be incorporated only by a device and a method, but may be incorporated by a program for realizing functions corresponding to the structures of the embodiments of the present invention or recording media in which the program is recorded, or the above realization may be easily embodied by those skilled in the art based on the specification of the embodiments of the present invention.

According to the embodiments of the present invention, a cache operation is possible by a buffer embedded in a controller when an operation using only one channel is performed in a memory system including a plurality of channels, thereby increasing operation speed.

Although the present invention is explained with reference to exemplary embodiments, it will be apparent to those skilled in the art that various modifications can be made to the above-described exemplary embodiments of the present invention without departing from the spirit or scope of the invention. The technical scope of the present invention is disclosed in the appended claims, and it is intended that the present invention cover all modifications provided they come within the scope of the claims and their equivalents.

What is claimed is:
1. A memory system comprising:
a first host channel directly connected to a host and a first flash translation layer;

a separate second host channel directly connected to the host and a separate second flash translation layer;
a first control circuit suitable for communicating with the host through the first host channel;
a second control circuit suitable for communicating with the host through the second host channel;
a first chip group suitable for communicating with the first control circuit through a first internal channel; and
a second chip group suitable for communicating with the second control circuit through a second internal channel,
wherein the first control circuit and the second control circuit alternately receive a plurality of data inputted through the first host channel during a single channel operation using one of the first and second host channels, and
the first control circuit and the second control circuit alternately transmit the plurality of data to the first chip group and the second chip group by performing a cache operation.

2. The memory system of claim 1, further comprising:
a first flash translation layer part connected between the first host channel and the first control circuit and suitable for transforming data received through the first host channel; and
a second flash translation layer part connected between the second host channel and the second control circuit and suitable for transforming data received through the second host channel.

3. The memory system of claim 2,
further comprising a first buffer connected between the second translation layer part and the first control circuit,
wherein the second control circuit receives and latches first data from the second flash translation layer part, and
the first buffer latches and transmits second data subsequent to the first data from the second flash translation layer part to the first control circuit.

4. The memory system of claim 3,
further comprising a second buffer connected between the first translation layer part and the second control circuit,
the second buffer latches and transmits second data subsequent to the first data from the first flash translation layer part to the second control circuit.
The amendment was approved by Leonard B. Taylor (Reg. No. 50376) on May 16, 2018 over the phone.

5. The memory system of claim 3, wherein the second data stored in the first buffer is transmitted to the first control circuit at the same time when the first data latched in the second control circuit is transmitted to the second chip group.

6. The memory system of claim 3, wherein the second buffer is included in an SRAM or a DRAM disposed between the host and the first control circuit.

7. The memory system of claim 4, wherein the first control circuit alternately transmits a plurality of read data read from the first chip group to the first flash translation layer part and the first buffer during a data output operation.

8. The memory system of claim 4, wherein the first buffer is included in an SRAM or a DRAM disposed between the host and the second control circuit.

9. The memory system of claim 7, wherein the first flash translation layer part transforms the read data received from the first control circuit and transmits transformed read data to the first host channel, and the second flash translation layer part receives the read data from the first buffer, transforms the read data, and transmits transformed read data to the second host channel at the same time during the data output operation.

10. A memory system comprising:
a first host channel directly connected to a host and a first flash translation layer;
a separate second host channel directly connected to the host and a separate second flash translation layer;
a first flash translation layer part connected to the first host channel;
a first control circuit suitable for receiving first data from the first flash translation layer part and transmitting the first data to a first memory chip group;
a second flash translation layer part connected to the second host channel;
a second control circuit suitable for receiving second data from the second flash translation layer part and transmitting the second data to a second memory chip group;
a first buffer suitable for receiving the second data from the second flash translation layer part, latching the second data, and transmitting latched second data to the first control circuit; and
a second buffer suitable for receiving the first data from the first flash translation layer part, latching the first data, and transmitting latched first data to the second control circuit,
wherein the first control circuit and the second buffer alternately receive the first data input through the first host channel during a single channel operation using one of the first and second host channels, and
the first control circuit and the second control circuit alternately transmit the first data to the first memory chip group and the second memory chip group by performing a cache operation.

11. The memory system of claim 10, wherein the first control circuit transmits the first data to the first memory chip group and the second buffer transmits the latched first data to the second control circuit at the same time during a data input operation.

12. The memory system of claim 10, wherein the first control circuit alternately transmits data read from the first memory chip group, which is selected during a data output operation using a single channel, to the first buffer and the first flash translation layer part.

13. The memory system of claim 12, wherein the first flash translation layer part transforms data received from the first control circuit and transmits transformed data to the first host channel, and the second flash translation layer part receives data from the first buffer, transforms the data, and transmits transformed data to the second host channel at the same time during the data output operation.

14. The memory system of claim 10, wherein the first buffer and the second buffer are included in an SRAM or a DRAM disposed between the first and second flash translation layer parts and the first and second control circuits.

15. A method of operating a memory system, comprising:
providing a memory system including a first flash translation layer part corresponding to a first host channel directly connected to a host and a first flash translation layer, a first control circuit, a second flash translation layer part corresponding to a first memory chip group and a separate second host channel directly connected to the host and a separate second flash translation layer, a second control circuit, and a second memory chip group;

selecting the first host channel during a single channel operation using one of the first and second host channels;

inputting data to the first flash translation layer part through the first host channel to sequentially output first data, second data and third data whose addresses are transformed;

transmitting the first data to the first control circuit connected to the first memory chip group;

transmitting the first data to the first memory chip group and transmitting the second data to the second control circuit connected to the second memory chip group at the same time; and transmitting the second data to the second memory chip group and transmitting the third data to the first control circuit at the same time.

16. A method of operating a memory system, comprising:

providing a memory system including a first flash translation layer part corresponding to a first host channel directly connected to a host and a first flash translation layer, a first control circuit, a second flash translation layer part corresponding to a first memory chip group and a separate second host channel directly connected to the host and a separate second flash translation layer, a second control circuit, and a second memory chip group;

performing a read operation on the first memory chip group;

transmitting a plurality of read data to the first control circuit connected to the first memory chip group through an internal channel;

alternately transmitting a plurality of data received in the first control circuit to the first flash translation layer part and the second control circuit corresponding to the second memory chip group;

transmitting data stored in the second control circuit to the second flash translation layer part while transforming data transmitted to the first flash translation layer part; and outputting data transformed by the first flash translation layer part and the second flash translation layer part to the first host channel and the second host channel.

* * * * *